's Patent [19]

Gama et al.

[11] 4,056,438
[45] Nov. 1, 1977

[54] LIQUID SODIUM COOLED FAST REACTOR

[75] Inventors: Jean-Michel Gama, Ormesson; Jean Lallement, Verriéŕes-le-Buisson; Lucien Pugnet, Boulogne, all of France

[73] Assignee: Commissariat a l'Energie Atomique, Paris, France

[21] Appl. No.: 705,693

[22] Filed: July 15, 1976

Related U.S. Application Data

[63] Continuation of Ser. No. 513,817, Oct. 10, 1974, abandoned.

[30] Foreign Application Priority Data

Oct. 18, 1973 France .............................. 73.37232

[51] Int. Cl.² ........................................... G21C 15/12
[52] U.S. Cl. ...................................... 176/50; 176/40; 176/65
[58] Field of Search ...................... 176/40, 50, 61, 62, 176/63, 65, 87, 17, 18

[56] References Cited

U.S. PATENT DOCUMENTS 2,852,456  9/1958  Wade ...................................... 176/18
3,322,643  5/1967  Sprague et al. ......................... 176/61
3,784,443  1/1974  Vercasson ............................... 176/40
3,888,730  6/1975  Jackson .................................. 176/65
3,932,214  1/1976  Aubert et al. ........................... 176/87

FOREIGN PATENT DOCUMENTS 1,005,489  9/1965  United Kingdom ................... 176/65
1,214,439  12/1970  United Kingdom ................... 176/65

Primary Examiner—Samuel W. Engle
Assistant Examiner—S. A. Cangialosi
Attorney, Agent, or Firm—Cameron, Kerkam, Sutton, Stowell & Stowell

[57] ABSTRACT

A set of cylindrical shells is interposed between the main vessel wall of an integrated sodium-cooled fast reactor and the primary core containment vessel so as to form a siphon having two downwardly directed branches. One branch opens into the intervessel zone which is separated from the primary vessel by a shell. The other branch which is nearest the main vessel wall is supplied with part of the cold sodium which has been withdrawn from the intervessel zone by means of pumps and reinjected into the bottom of the reactor core.

7 Claims, 4 Drawing Figures

LIQUID SODIUM COOLED FAST REACTOR

This is a continuation, of application Ser. No. 513,817, filed Oct. 10, 1974, now abandoned.

This invention relates to a fast reactor of the liquid sodium cooled type.

In more exact terms, the present invention is concerned with a nuclear reactor which embodies special and novel arrangements for cooling the main vessel wall of said reactor and more especially the upper portion of said wall.

The so-called integrated reactor concept is generally understood to apply to a type of nuclear reactor in which the primary coolant circuit is placed entirely within the main vessel of the reactor. In other words, the primary heat exchangers as well as the pumps for circulating the primary fluid are placed entirely within the main reactor vessel.

A more thorough understanding of the problem which can now be solved by means of the present invention will be gained by reference to the accompanying FIG. 1 in which the main vessel of a liquid sodium cooled integrated reactor is shown diagrammatically in vertical cross-section.

There is illustrated in this figure the concrete reactor vault 2 which is closed by the vault roof 4, said roof being adapted to carry a number of rotating shield plugs such as the plugs 6 and 8. The reactor containment vessel proper is constiituted by the wall 10 of the main vessel which contains the entire quantity of primary sodium. The main vessel 10 is directly suspended from the vault roof 4. The reactor core 12 is constituted by fuel assemblies inserted at the lower ends in the reactor core support grid 14. Said support grid 14 rests on a diagrid 16 which is in turn carried by the main vessel 10. Provision is made within the vessel for a number of primary pumps such as the pump 18 and primary heat exchangers such as the heat exchanger 20. The zones reserved for the hot sodium 21 and the cold sodium 22 are separated by the cylindrical shell 34 and the annular skew wall 24. The interior of the shell 34 constitutes the primary vessel which contains the hot sodium, whilst the cold sodium is present within the space 22 or so-called intervessel zone between the cylindrical shell 34, the main vessel 10 and the diagrid 16.

The sodium flows upwards through the fuel assemblies of the reactor core 12, is discharged into the primary vessel in the hot state, then penetrates into the heat exchanger 20 and is discharged from this latter at 26 into the intervessel zone 22 in which said sodium is therefore in the cold state. This cold sodium is drawn up by the pump 18 and delivered at low pressure into the reactor core support grid 14 via the duct 28, whereupon the cycle continues.

In order to protect the reactor vault roof 4 and the rotating shield system, a blanket 30 of argon under pressure is provided at the top of the main vessel 10.

The main vessel 10 which supports the complete assembly consisting of all the installations is subjected to very high thermal gradients. In fact, the sodium temperature at the reactor core inlet (cold sodium) is of the order of 400° C and the sodium temperature at the reactor core outlet (hot sodium) is of the order of 560° C. A fraction of the cold sodium flow is employed for the purpose of cooling the main vessel 10 which reduces the temperature gradient in the vessel and shortens the startup time of the reactor. In order to cause the cold sodium to flow in contact with the walls of the main vessel, provision is made for two concentric baffle-plate elements 32 and 34 in which are formed the passages 36 and 38. The passage 36 has its opening beneath the fuel assemblies and withdraws a small portion of the cold sodium flow which is injected into the reactor core support grid 14 at the lower end of the fuel assemblies. The cold sodium returns downwards through the passage 38 into the intervessel zone 22.

This cooling system which is sufficient for fast reactors in the medium-power range becomes distinctly insufficient in the case of high-power reactors (having an electrical output of 1000 MW, for example). In fact, at the time of changes in reactivity or power level of the reactor, the level of hot sodium varies and the same therefore applies to the level of cold sodium within the passages 36 and 38. The connection between the passages 36 and 38 is not closed at the top and is simply limited by the layer of argon 30 which is placed over the entire main vessel assembly. In the event of an increase in level of hot sodium, the level of cold sodium between the main vessel 10 and the cylindrical shell 34 accordingly rises. There is therefore present at the top portion of the cold sodium a very thick layer which is not circulated. This unrenewed layer of substantial thickness is heated by the radiations emitted by the hot sodium and it is therefore no longer possible by this means to cool the main vessel in the zone in which this latter is in contact with this motionless layer of sodium. In point of fact, this zone corresponds precisely to the top portion of the main vessel where the stress applied to the vessel is of highest value. On the contrary, in the event of a reduction in the level of cold sodium, an overflow phenomenon occurs as the cold sodium passes over the cylindrical shell 34. When this overflow takes place, argon bubbles are liable to be introduced into the sodium which follows the passage 38. This is clearly likely to be highly objectionable since the intended function of this sodium is to cool the reactor fuel assemblies. And it is known that the presence of argon in sodium reduces the specific heat of liquid sodium to a considerable extent.

The present invention is precisely directed to a nuclear reactor which overcomes the above-mentioned disadvantages, by preventing in particular the formation of a stagnant layer of cold sodium and the overflow phenomenon.

The reactor essentially comprises a cylindrical main vessel provided with an end-wall and within said main vessel a reactor core constituted by fuel assemblies resting on a support structure, said core being cooled by liquid sodium which flows upwards through the fuel assemblies of the reactor core prior to introduction into primary heat exchangers from which the cold sodium is discharged into a bottom zone of the main reactor vessel or so-called intervessel zone which is separated from the remainder of the vessel by a shell, said cold sodium being withdrawn from said zone in order to be reinjected under pressure by means of pumps into the lower portion of the reactor core fuel assemblies. The reactor essentially comprises in addition at least one assembly of cylindrical shells having the same axis as said vessel and so arranged as to form a two-branch siphon interposed between the hot sodium and the main vessel wall in at least the upper portion of said vessel, the two branches of said siphon being directed towards the bottom of the reactor, the branch which is nearest the main vessel wall being supplied with part of the cold sodium which is injected into the bottom of the reactor core whilst the second branch opens into the intervessel zone.

A clearer understanding of the invention will in any case be gained from the following description of a number of embodiments of the invention which are given by way of example without any limitation being implied, reference being again made to the accompanying drawings and more especially to FIGS. 2 to 4, wherein.

Figure 1:
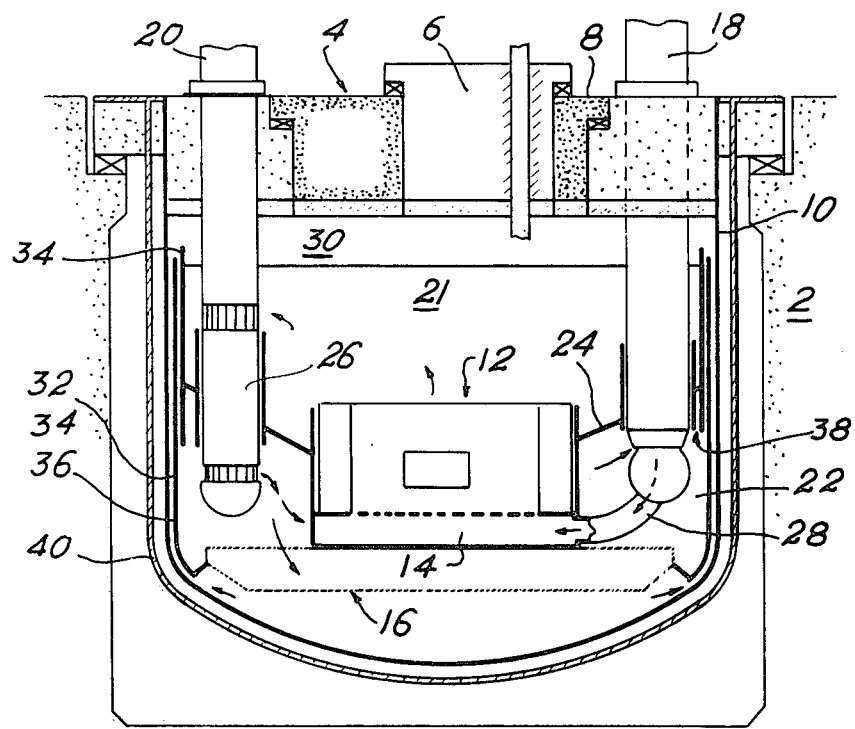
FIG. 1 is a sectional view in elevation showing a nuclear reactor in accordance with the prior art.
Figure 2:
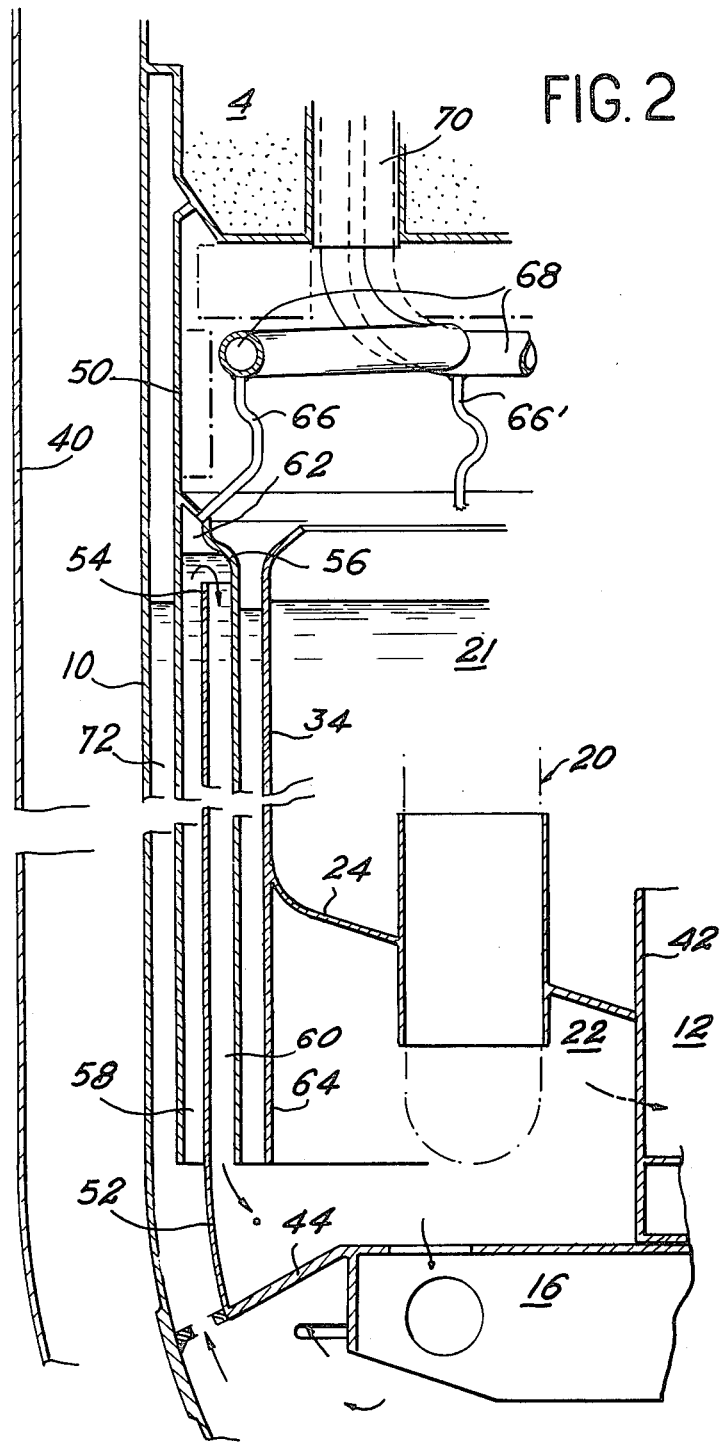
FIG. 2 is a first embodiment in which the siphon comprises at the top portion thereof a chamber containing a gas under pressure and means for starting the flow in said siphon.

In FIG. 2, there is shown a partial view in diametrical cross-section of a reactor vessel provided with the cooling system in accordance with the invention. The reactor structure as a whole is clearly of revolution about an axis which is not shown in the figure. All the shells which will be described below are cylindrical shells of revolution about the axis of the reactor vessel.

There is shown in this figure the main vessel 10 which is suspended from the reactor vault roof or shield plug system 4. The main vessel is surrounded by a leak-jacket 40 which serves to collect the sodium in the event of accidental leakage without giving rise to any appreciable drop in the level of sodium. There is again shown in the figure the reactor core 12 surrounded by a cylindrical wall 42 and supported by the diagrid 16 which is rigidly fixed to the main vessel by means of the skew-section shell element 44. The primary vessel is limited by the cylindrical shell 34 and by the frusto-conical shell element 24 which is joined to the reactor jacket 42 and therefore contains the hot sodium. It is apparent that the shell 48 is traversed by the heat exchanger 20 and by the pumps 18.

The cooling system proper is constituted by a series of cylindrical shells which are parallel to each other and are coaxial with the main reactor vessel. From the exterior to the interior of the vessel, provision is made successively for a first shell 50 which is joined at the top portion thereof to the reactor vault roof 4. A second shell 52 which is open at the top end 54 is joined at the lower end to the vessel 10. The third shell 56 is joined at the top end to the shell 50 in such a manner that the shells 50, 52 and 56 constitute a siphon formed by the annular passages 58 and 60 which are joined to each other at the top ends by the chamber 62. The passage 58 opens directly towards the diagrid 16 and therefore towards the reactor core support grid 14 whilst the passage 60 opens towards the intervessel zone 22. Finally, the shell 34 which limits the primary vessel has an extension in the form of a cylindrical shell element 64. The annular chamber 62 comprises a certain number of branch pipes 66 and 66' which are uniformly spaced along the length of said chamber. Said branch pipes open into a central manifold 68 joined to a duct 70 which traverses the reactor vault roof 4. The design function of these branch pipes will be explained in greater detail hereinafter.

The branch pipes 66, manifold 68 and duct 70 all contain argon under pressure and are fitted with means for regulating the quantity of argon which is introduced therein. This argon circuit is independent of the circuit which feeds the top blanket of the primary vessel of the reactor.

The operation of the device is as follows: at the moment of reactor start-up, a low pressure of argon is developed within the manifold 68 and the duct 70. A certain value of negative pressure is therefore produced within the chamber 62. The annular passages 58, 52 and 60 constitute a siphon which is started by the negative pressure or partial vacuum created within the chamber 62. The siphon is fed by the cold sodium derived from the support grid of the reactor core 12 and which is therefore under a low value of pressure. Once the siphon has been started, the quantity of argon within the duct 70 and the manifold 68 is adjusted so as to establish the level of cold sodium within the chamber 62 at the normal operating regime. It is observed that the cold sodium which is present within the passage 72 limited by the main vessel 10 and the shell 50 is separated from the hot sodium contained in the primary vessel 21 by the double thickness of cold sodium which circulates within the siphon (passages 58 and 60). The cold sodium which circulates continuously within said siphon is not heated as a result of radiation by the hot sodium contained in the primary vessel 21; the same therefore applies to the sodium stored within the annular space 72 which is in direct contact with the main vessel 10 of the reactor. The rise in level of cold sodium within the chamber 62 under the action of a rise in the level of hot sodium within the primary vessel is limited by the increase in pressure of the argon contained in the chamber 62 since the rise in the level of cold sodium reduces the available volume in respect of the constant quantity of argon. Similarly, a fall in the level of hot sodium within the primary vessel results in a fall in the level of cold sodium within the chamber 62. This drop in level is limited by the reduction in the pressure of argon prevailing within the chamber 62. The result thereby achieved is self-regulation of the sodium level within said chamber.

Figure 3:
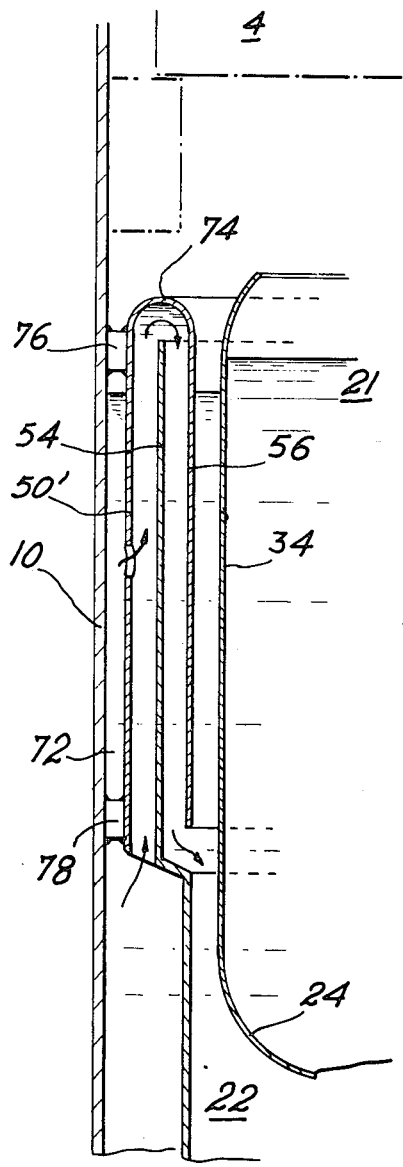
FIG. 3 is a first alternative embodiment in which the siphon does not comprise gas chambers.

FIG. 3 shows a first alternative embodiment of the system employed for cooling the main vessel in accordance with the invention. In this figure, the components which have already been illustrated in FIG. 2 are naturally given the same references in FIG. 3. The shell 50' which performs the same function as the shell 50 of FIG. 2 is not longer joined directly to the reactor vault roof 4 but is joined instead to the shell 56 by means of a half-torus 74. In this alternative embodiment, the shells 50' and 56 are no longer rigidly fixed to the reactor shield plug system. In order to hold said shells in position, it is possible by way of example to weld them to radial fins such as the fins 76 and 78 which are in turn welded to the main vessel 10. There have not been shown in the figure the ancillary pipes which open into the top portion of the siphon through the half-torus 74 and which serve to start the flow within the siphon by creating a partial vacuum.

It is readily apparent that this alternative embodiment involves exactly the same mode of operation as in the embodiment which was illustrated in FIG. 2; it is more simple than this latter but does not make it possible to vary the quantity of gas within the upper chamber (namely the chamber 62 shown in FIG. 2). In fact, these levels are maintained substantially constant by leaving a relatively small flow cross-section between the upper end of the shell 54 and the sheet-metal element 74 which has the shape of a half-torus. This accordingly prevents the formation of a stagnant top layer.

Figure 4:
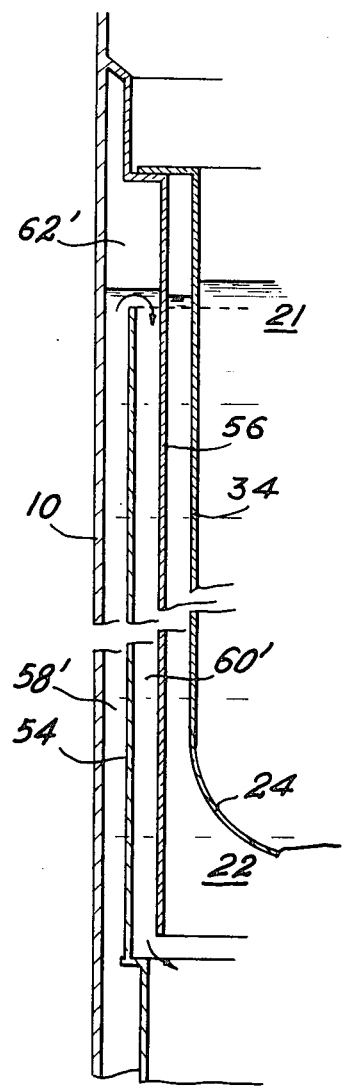
FIG. 4 is a second alternative embodiment in which the siphon is directly applied against the main vessel wall.

In the alternative embodiment shown in FIG. 4, the shell 50 (or 50' of FIG. 3) has been dispensed with and the part played by this shell is performed instead by the wall of the main vessel 10 itself. In other words, the passage 72 is no longer provided. As in the alternative embodiment shown in FIG. 2, the upper portion of the shell 56 is joined to the main vessel 10. A chamber 62' is thus obtained at the top portion of the siphon (constituted by the annular passages 58' and 60' which are limited by the cylindrical shells 10, 54 and 56). The cold sodium derived from the support grid 14 and from the reactor core 12 flows upwards through the annular passage 58' into the chamber 62' and returns downwards through the annular passage 60' towards the intervessel zone 22. The quantity of argon placed within the annular chamber 62' is adjusted at the outset. As in the first embodiment, the compressions and expansions of the quantity of argon enclosed within the chamber 62' permit an approximate adjustment of the level of cold sodium within the chamber 62' as a function of reactor power variations, that is to say as a function of the variations in level of the hot sodium within the primary vessel 21 of the reactor.

It is readily apparent that there would be no departure from the scope or the spirit of the invention if the devices described in the foregoing were modified in shape or form. The invention is in fact concerned with devices which are interposed between the wall of the main vessel and the primary vessel which contains the hot sodium, these devices being mainly constituted by an annular siphon surrounding the entire portion of the main vessel which is located above the intervessel zone and which would be in contact with the hot sodium but for the presence of said siphon.

What we claim is:

1. A reactor comprising a cylindrical main vessel having an upper edge and having a blanket of inert gas at the top, an end-wall for said main vessel secured to said upper edge and forming a sealed enclosure, a primary vessel within each said main vessel, a reactor core within said primary vessel, fuel assemblies is said core, a support structure for said fuel assemblies, a liquid sodium coolant for said core which flows upwards through said fuel assemblies of said reactor core and exiting said core as hot metal coolant, primary heat exchangers in said primary vessel receiving said hot coolant from said core, cold liquid sodium exiting from said heat exchangers into a bottom zone of said main reactor vessel or intervessel zone, a primary vessel separating said zone from the remainder of said vessel, pumps within said primary vessel for withdrawing said cold sodium from said zone and for reinjecting said cold sodium under pressure into the lower portion of said reactor core fuel assemblies, and at least one assembly of cylindrical shells having the same axis as said main vessel and surrounding said primary vessel, a two-branch siphon formed by said shells interposed between the hot sodium and the main vessel wall in at least the upper portion of said vessel preventing stagnation of the sodium, said two branches of said siphon being connected at their upper ends above the level of separation of the sodium and the inert gas and opening towards the bottom of the reactor, the branch of said siphon nearest said main vessel wall being supplied at low pressure with part of the cold sodium only injected into the bottom of said reactor core and the second branch of said siphon opening into said intervessel zone.

2. A reactor according to claim 1, including a first shell for said siphon joined at the upper end to the wall of said main vessel and the lower portion of which is free and opens into said intervessel zone, a second cylindrical shell for said siphon between the wall of said main vessel and said first shell, two annular spaces between said shells, the top edge of said second shell being free and providing a passage between said two annular spaces, the bottom edge of said second shell being joined to said reactor core supported structures.

3. A reactor according to claim 1, including a first cylindrical shell for said siphon rigidly fixed at the top edge thereof to the reactor vault roof and the bottom edge of which is free, a second cylindrical shell for said siphon whose top edge is flared-out towards said first shell and is joined to said first shell and whose free bottom edge extends into said intervessel zone, a third cylindrical shell for said siphon between said two first shells, two annular spaces between said shells, the top edge of said third shell being free providing a passage between said two annular spaces, the bottom edge of said third shell being joined to said reactor core support structures.

4. A reactor according to claim 3, including pipes in the flared-out portion of said second shell opening at points which are uniformly spaced on the periphery of said shell, and a manifold in said primary vessel for the introduction of gas under pressure into said pipes.

5. A reactor according to claim 1, including a first shell of revolution for said siphon about the axis of said main vessel, the cross-section of said shell through a diametrical half-plane being in the shape of a U which is open at the bottom end thereof, a second cylindrical shell for said siphon between the two arms of the U-shaped shell, two annular spaces formed by said second shell within the interior of said first shell, the top edge of said second shell being free providing a passage between said two annular spaces, the bottom edge of said shell being joined to said reactor core support structure.

6. A reactor comprising a cylindrical main vessel having an upper edge and having a blanket of inert gas at the top, an end-wall for said main vessel secured to said upper edge and forming a sealed enclosure, a primary vessel within said main vessel, a reactor core within said primary vessel, fuel assemblies for said core, a support structure supporting said fuel assemblies, a liquid sodium coolant for said core which flows upwards through said fuel assemblies of said reactor core and exiting said core as hot metal coolant, primary heat exchangers in said primary vessel receiving said hot coolant from said core, cold sodium exiting from said heat exchangers into a bottom zone of said main reactor vessel or intervessel zone, said primary vessel separating said zone from the remainder of said vessel, pumps within said primary vessel for withdrawing the cold sodium from said zone and for reinjecting said cold sodium under pressure into the lower portions of said reactor core fuel assemblies, at least one assembly of cylindrical shells having the same axis as said main vessel and surrounding said primary vessel, a two-branch siphon formed by said shells interposed between the hot sodium and said main vessel wall in at least the upper portion of said vessel preventing stagnation of the sodium, the two branches of said siphon being connected at their upper ends above the level of separation of the sodium and the inert gas and opening towards the bottom of said reactor, the branch of said siphon nearest said main vessel wall being supplied at low pressure with part of the cold sodium only injected into the bottom of said reactor core and the second branch of said siphon opening into said intervessel zone, a first shell for said siphon joined at the upper end to said wall of said main vessel and the lower portion of which is free and opens into said intervessel zone, a second cylindrical shell between said wall of said main vessel and said first shell forming two annular spaces, the top edge of said second shell being free and providing a passage between said two annular spaces, the bottom edge of said second shell being joined to said reactor core support structures, a flared-out portion for said second shell, pipes in said portion having openings at points uniformly spaced on the periphery of said shell, and a manifold in said primary vessel for the introduction of gas under pressure into said pipes.

7. A reactor comprising a cylindrical main vessel having an upper edge and having a blanket of inert gas at the top, an end-wall for said vessel secured to said upper edge and forming a sealed enclosure, a primary vessel within said main vessel, a reactor core within said primary vessel, fuel assemblies for said core, a support structure supporting said fuel assemblies, a liquid sodium coolant for said core which flows upward through the fuel assemblies of the reactor core and exits as hot sodium coolant, primary heat exchangers in said primary vessel receiving said hot sodium coolant from said core, cold sodium coolant exiting from said exchangers into a bottom zone of said main reactor vessel or intervessel zone, said primary vessel separating said zone from the remainder of said vessel, pumps within said primary vessel for withdrawing said cold sodium from said zone and for reinjecting said cold sodium under pressure into the lower portion of said reactor core fuel assemblies, and at least one assembly of cylindrical shells having the same axis of said main vessel and surrounding said primary vessel, a two-branch siphon formed by said shells interposed between the hot sodium and said main vessel wall in at least the upper portion of said vessel preventing stagnation of the sodium, the two branches of said siphon being connected at their upper ends above the level of separation of the sodium and the inert gas and opening towards the bottom of said reactor, the branch of said siphon nearest said main vessel wall being supplied at low pressure with part of the cold sodium only injected into the bottom of said reactor core and the second branch of said siphon opening into said intervessel zone, a first cylindrical shell for said siphon rigidly fixed at the top thereof to the reactor vault roof and the bottom edge of which is free, a second cylindrical shell for said siphon, a top edge for said second shell flared-out towards said first shell and joined to said first shell, a free bottom edge for said second shell extending into said intervessel zone, a third cylindrical shell between said two first shells forming two annular spaces therebetween, a top edge of said third shell being free and providing a passage between said two annular spaces, a bottom edge of said third shell being joined to said reactor core support structures, pipes in the flared-out portion of said second shell having openings at points uniformly spaced on the periphery of said shell, and a manifold in said primary vessel for the introduction of gas under pressure into said pipes.

* * * * *